US006493629B1

(12) United States Patent
Van Bosch

(10) Patent No.: US 6,493,629 B1
(45) Date of Patent: Dec. 10, 2002

(54) METHOD OF AND SYSTEM FOR COUPLING LOCATION INFORMATION

(75) Inventor: James A. Van Bosch, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/004,555

(22) Filed: Dec. 3, 2001

(51) Int. Cl.[7] .............................................. G01C 21/30
(52) U.S. Cl. ...................................................... 701/207
(58) Field of Search ................................. 701/207, 211, 701/213, 214, 24, 29, 45; 342/357.01, 357.08, 357.09, 357.1; 370/310

(56) References Cited

U.S. PATENT DOCUMENTS 5,703,929 A * 12/1997 Schillaci et al. ............... 379/21
6,330,499 B1 * 12/2001 Chou et al. ..................... 701/33
6,340,928 B1    1/2002 McCurdy

OTHER PUBLICATIONS

Architecture Development Team, Lockheed Martin, "National ITS Architecture Theory Of Operations", Dec. 1999, pp. 76–85.

* cited by examiner

Primary Examiner—Yonel Beaulieu
(74) Attorney, Agent, or Firm—Kevin D. Wills

(57) ABSTRACT

A method for coupling location information from a vehicle includes the steps of providing a WLAN communication device with a controller in the vehicle; detecting an emergency condition; and attempting to create a communication link with a portable WLAN enabled device. A system for coupling location information from a vehicle includes a WLAN communication device with a controller installed in a vehicle; a WLAN enabled device in communication with the WLAN enabled controller in the vehicle using a WLAN protocol in response to an emergency condition; a wireless communication network in communication with the WLAN enabled device; and a public safety answering point in communication with the wireless communication network.

38 Claims, 7 Drawing Sheets

METHOD OF AND SYSTEM FOR COUPLING LOCATION INFORMATION

FIELD OF THE INVENTION

The present invention relates to a wireless communication devices, and more particularly to a method of and system for coupling location information from a vehicle to a device by way of a wireless local area network link.

BACKGROUND OF THE INVENTION

As the deployment of wireless local area networks (WLAN) continues to expand, new applications for data and new channels for providing data to individuals continue to evolve. One recent application for the transfer of data can be found in the area of telematics. Telematics is a term generally related to the provisioning of data and/or services to vehicles. One particularly beneficial aspect of a conventional telematics system is the transmission of emergency and/or location information related to a vehicle in the event of an emergency condition. For example, in a conventional telematics system, if a vehicle is in an accident and an air bag is deployed, the telematics unit in the vehicle will automatically contact a public safety answering point (PSAP) and/or a call center for a service associated with the telematics unit. The telematics unit could transfer information such as the location of the device or information related to the status vehicle of systems.

Most current telematics systems include a wireless communication device embedded within the vehicle for accessing a telematics service provider. For example, conventional telematics units include a cellular telephone transceiver to enable communication between the vehicle and a call center associated with telematics service for the vehicle. The vehicle could have a handset coupled to the cellular telephone transceiver and/or include hands free functionality within the vehicle. Alternatively, a portable phone operated by the user could be coupled to a "cradle" which enables communication between the portable device and the cellular telephone transceiver of the telematics system. The cradle could enable synchronization between the portable and the telematics system of the vehicle.

One advantage of having a cellular telephone transceiver integrated in the telematics system of the vehicle is that a higher power transceiver could be employed within the vehicle. For example, a 3 Watt cellular transceiver could be installed in the vehicle, which provides much greater power than a conventional 0.6 mn Watt transceiver used in a portable cellular telephone. Such higher power transceivers enable greater access to telecommunication services, for example when in rural areas or where base station coverage is generally weaker.

However, some low-end telematics systems have been proposed which do not include a separate cellular communication device installed in the vehicle, but use a user's portable wireless communication device which is coupled to the vehicle by way of a cradle or some other communication means. Although such an arrangement generally reduces cost, a portable wireless communication device may be less durable than a mobile cellular telephone installed in a vehicle. In the event of a collision, a portable wireless communication device of such a telematics communication system could become dislodged and damaged, rendering it unable to make the necessary call to the PSAP.

Accordingly, there is a need for an improved telematics system which enables the communication of emergency information to a PSAP in the event a portable wireless communication device of a telematics system is damaged during an emergency condition.

DESCRIPTION OF THE PREFERRED EMBODIMENTS

Figure 1:
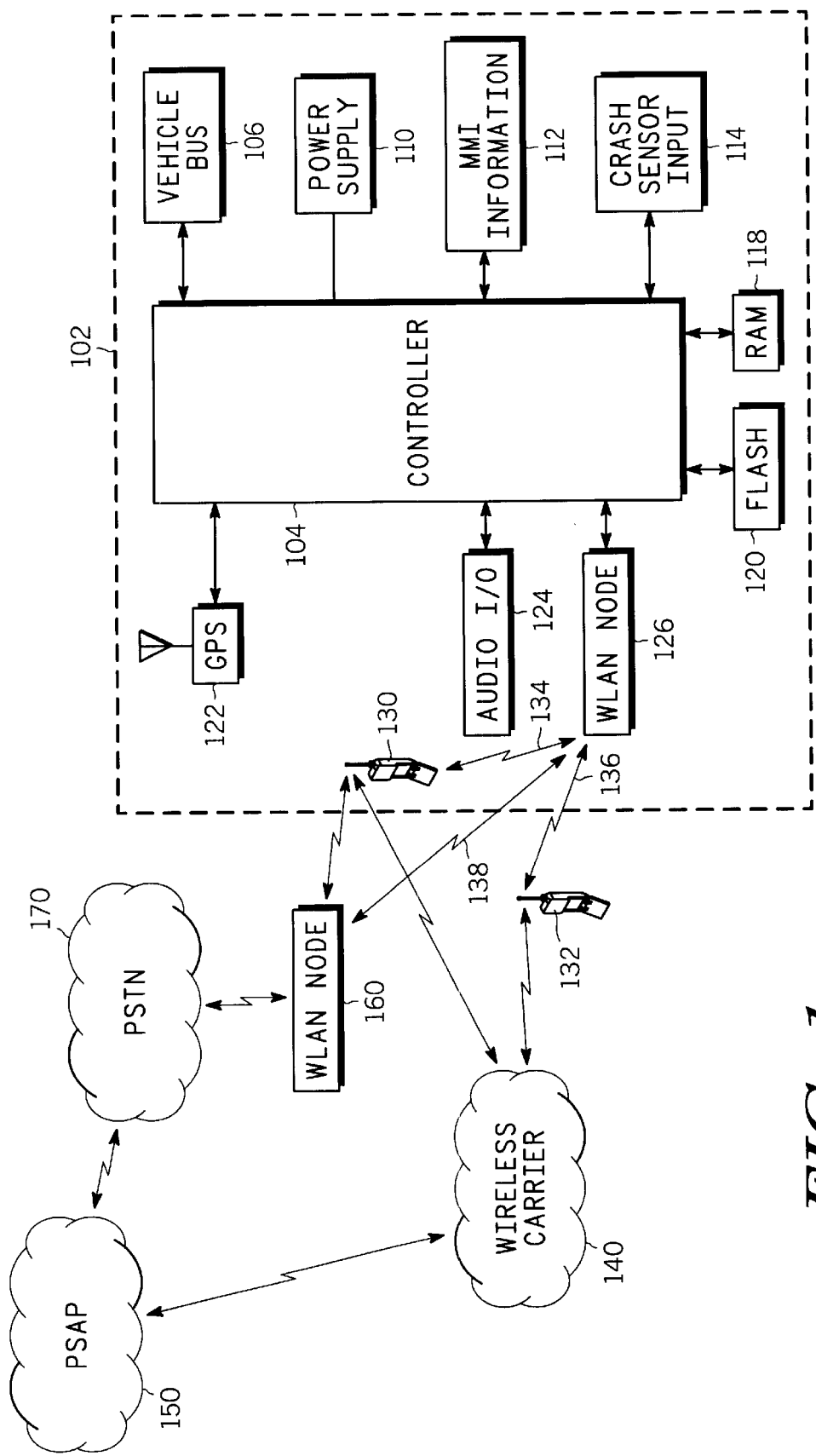
FIG. 1 is a block diagram of a system for communicating location information according to the present invention.

Turning now to FIG. 1, a block diagram of a telematics communication system according to the present invention is shown. A telematics unit 102 is provided in a vehicle according to the present invention. The telematics unit 102 preferably comprises a controller 104 having various input/output (I/O) ports for communicating with various components of the vehicle. For example, the 19 controller 104 is coupled to a vehicle bus 106, a power supply 110, a man machine interface (MMI) 112, and a crash sensor input 114. The controller 104 is also preferably coupled to various memory elements, such as a random access memory (RAM) 118 or a flash memory 120. The telematics system 104 also preferably includes a global positioning system (GPS) unit 122 which provides the location of the vehicle, as is well known in the art. Finally, the controller 104 is also preferably coupled to an audio I/O 124 which preferably includes a hands free system having a microphone and a speaker for audio communication for a user of the vehicle by way of a wireless communication network, such as a cellular telephone network. A wireless local area network (WLAN) node 126 is also coupled to the controller 104 and enables communication between a WLAN enabled device and the controller 104 by way of a WLAN communication link, such as by Bluetooth, EEEE 802.11, IrdA, or any other WLAN application. The WLAN node 126 could be a pc board enabling communication via a WLAN protocol installed in the telematics controller, or some other device coupled to the controller to enable separate WLAN devices to communicate with the controller.

The system of the present invention could include a separate WLAN enabled device 130 located within the vehicle. Such a separate WLAN device 130 could be another portable cellular telephone with a wireless local area communication means, or some other wireless communication device, such as a PDA or laptop computer which incorporates a PCMCIA card or embedded circuit enabling wireless communications over a WLAN. Similarly, another wireless communication devices 132 having WLAN communication capability could exist outside the vehicle. The WLAN node communicate with the wireless communication devices 130 and 132 via a WLAN communication protocol over a WLAN communication link 134 or 136, respectively. The wireless communication devices 130 and 132 generally communicate with a wireless carrier 140.

The wireless communication devices 130 and 132 preferably include a memory for storing an emergency public access request setting. As will be described in more detail in reference to later figures, an emergency public access request setting provides parameters defining access which will be granted to a third party who has indicated that an emergency condition exists. For example, the emergency public access request setting could indicate the type of access (e.g., voice or data), the time of access (e.g., anytime or only when the device is not in a call), etc.

Finally, a WLAN node 160 could exist outside the vehicle. Such a WLAN node 160 could communicate with the public switch telephone network (PSTN) 170. The WLAN node 160 could be for example a node along a roadway which may exist for providing traffic data to a traffic system. The WLAN node could be any type of transceiver for receiving information from a portable device by a WLAN protocol, as well as for communicating with a wide area network (WAN such as the wireless carrier 140 or the SPTN 170. Finally, both the wireless carrier 140 and the PSTN 170 could communicate with a PSAP 150, or some other entity for monitoring information related to a vehicle, such as a telematics call center which is well known in the art. Alternatively, the functionality of the PSAP 150 or a call center could be incorporated in the wireless carrier 140 or the PSTN 170.

Figure 2:
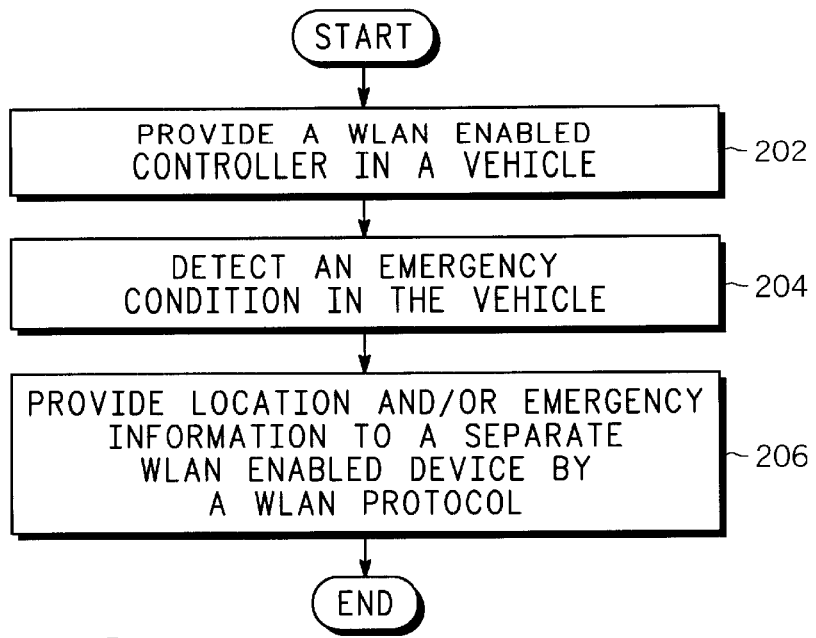
FIG. 2 is a flow chart showing a method for communicating location information according to the present invention.

Turning now to FIGS. 2–8, methods for coupling location information which could be employed in a communication network, such as the communication network of FIG. 1, are described. Referring first to FIG. 2, a flow chart shows a method for communicating location information according to the present invention. In particular, a WLAN enabled controller is provided in the vehicle at a step 202. An emergency condition is then detected at the vehicle at a step 204. The WLAN enabled controller then provides the location and/or emergency information to a separate WLAN enabled device by a WLAN protocol at a step 206. Such location and/or emergency information could be provided according to a WLAN protocol as standard messages which could be detected by another WLAN enabled device within range of the WLAN enabled controller. The data could be periodically transferred to increase the likelihood of being detected by a passing vehicle, and then transferred to a PSAP. The periodic transfer of data can be particularly important in the event of fast moving traffic by the scene of an accident. Although it may not be possible to maintain a communication link between the WLAN enabled controller of the vehicle and a separate WLAN device, it may be possible to receive data from a WLAN enabled device in a fast moving vehicle, for example.

Figure 3:
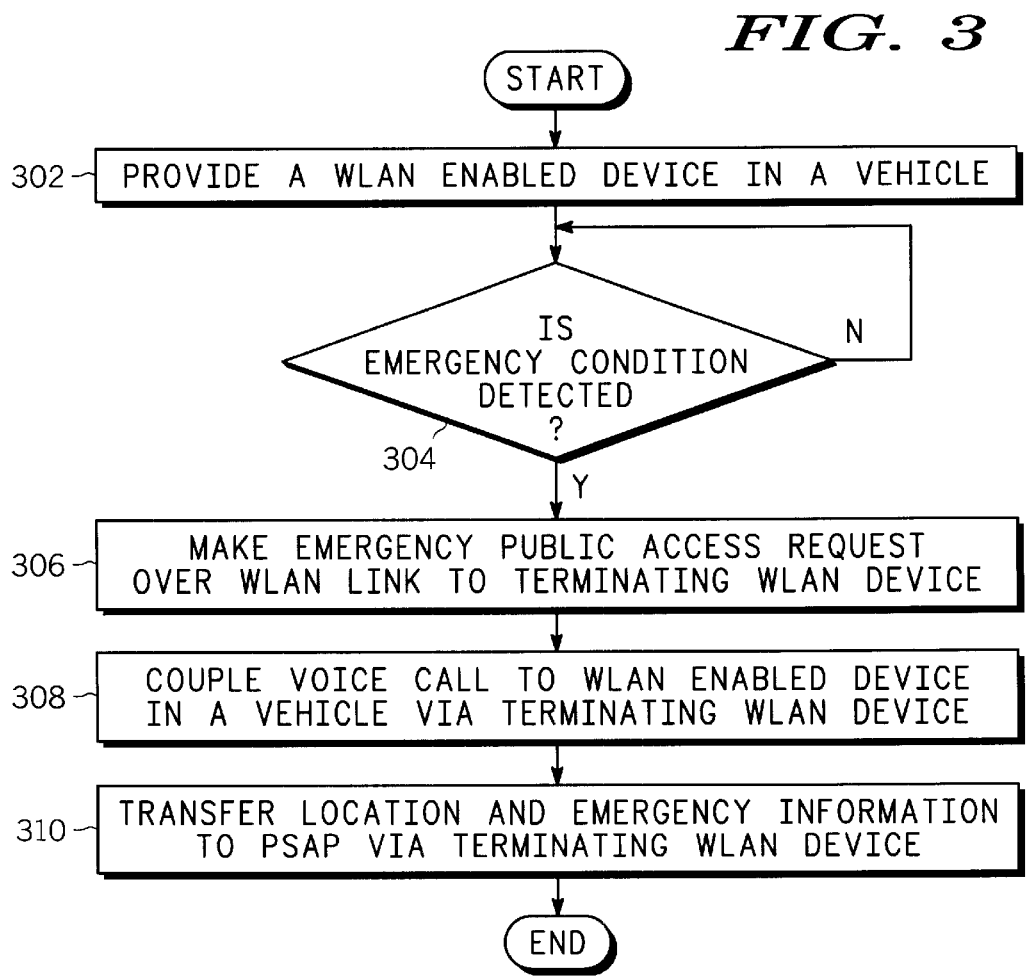
FIG. 3 is a flow chart of a method for communicating location information according to an alternate embodiment of the present invention.

Turning now to FIG. 3, a flow chart shows a method for communicating location information according to an alternate embodiment of the present invention. A WLAN enabled device, such as the WLAN enabled controller 104 of FIG. 1, is provided in a vehicle at a step 302. It is then determined whether an emergency condition is detected at the vehicle at a step 304. An emergency condition could include any abnormal state of the vehicle, as detected by any vehicle sensor or other component of a telematics unit in the vehicle. For example, an emergency condition could be detected by a crash sensor associated with an airbag system and coupled to the crash sensor input 114.

If an emergency condition is detected, an originating WLAN enabled device, such as controller 104, makes an emergency public access request over a WLAN link to a separate terminating WLAN device at a step 306. An emergency public access request preferably specifies the type of access desired (e.g., voice, data, both voice and data, etc.). Such a request to seize a voice or data channel would enable the WLAN enabled controller to control the transceiver of a terminating WLAN device according to parameters set by the terminating WLAN device. A terminating WLAN device could be, for example, a portable wireless communication device having cellular telephone capability and WLAN capability located within the vehicle, or could be a separate wireless communication device outside the vehicle. Alternatively, the WLAN enabled controller could attempt to access a WLAN node of a communication system, such as WLAN node 160 of FIG. 1.

A voice call is then coupled to the originating WLAN device via a terminating WLAN device at a step 308. For example, the wireless communication device 132 could be communicating with a PSAP 150 by way of the wireless carrier 140. Because the controller 104 of the telematics unit 102 is WLAN enabled, the controller 104 can create a WLAN link to the terminating WLAN device. Accordingly, the voice call from the PSAP to the terminating WLAN enabled device could be provided to the user of the vehicle by way of the WLAN node 126 and the audio I/O 124. That is, the WLAN link between the wireless communication device 132 and the WLAN node 126 could enable a voice connection between the PSAP and a user in the vehicle utilizing hands free capability of telematics unit, even if the wireless communication device normally used in the vehicle is inoperative. The controller of the vehicle then preferably transfers location and/or emergency information to the PSAP via the WLAN connection and a wireless carrier at a step 310. Emergency information could include any information related to the vehicle, including current or stored vehicle system information.

Figure 4:
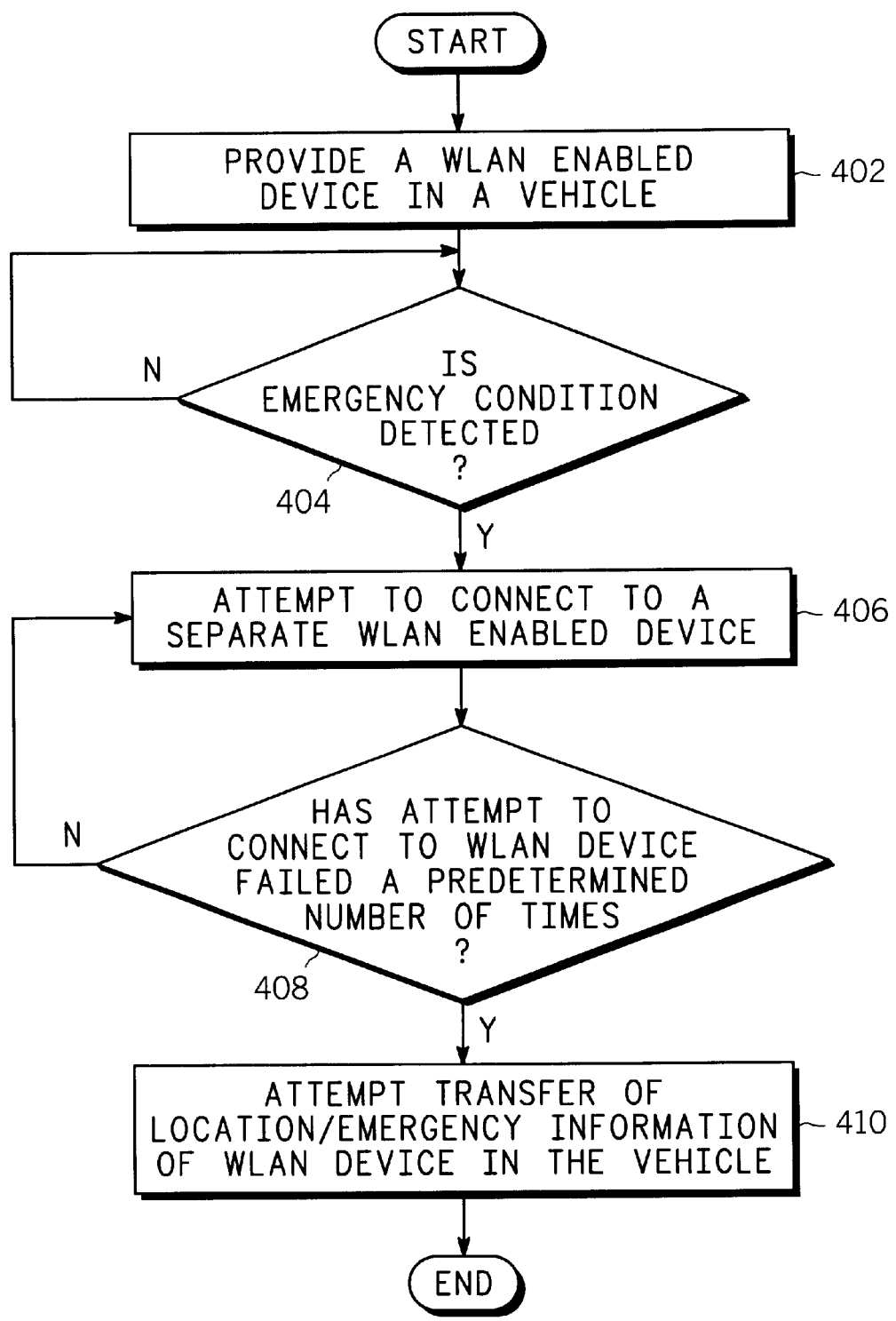
FIG. 4 is a flow chart of a method for communicating location information according to an alternate embodiment of the present invention.

Turning now to FIG. 4, a method for communicating location information according to an alternate embodiment of the present invention is shown. A WLAN enabled device is provided in a vehicle at a step 402. It is then determined whether an emergency condition is detected at a step 404. A WLAN enabled controller of a telematics unit attempts to connect to a separate WLAN device within or near the vehicle at a step 406. It is then determined whether the attempts to connect to the WLAN device failed a predetermined number of times at a step 408.

If the attempts have not failed a predetermined number of times, the WLAN enabled controller continues to attempt to connect to a separate WLAN device at a step 406.

However, if the attempts have failed a predetermined number of times, the WLAN enabled controller of the vehicle attempts to transfer location and/or emergency information to a separate WLAN enabled device at a step 410.

That is, although a voice communication link might not be established, it is possible to "broadcast" location and/or emergency information to any device which may receive it. Such a broadcast of the information could be particularly significant in It the event that a separate WLAN enabled device in a vehicle which may be moving quickly past a disabled vehicle could receive the information, but not necessarily make a voice communication link with the vehicle.

Figure 5:
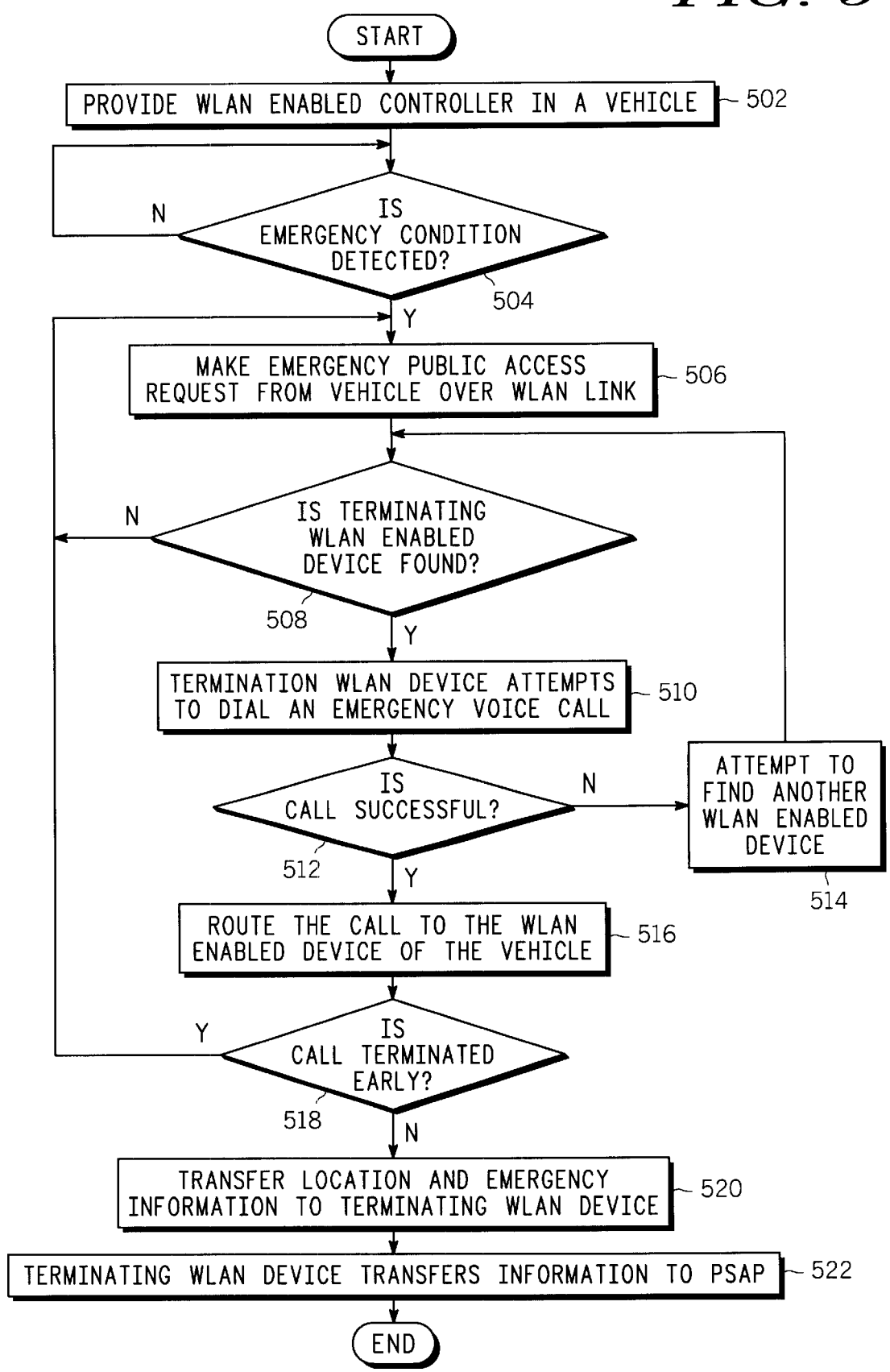
FIG. 5 is a flow chart showing a method for communicating location information according to the present invention.

Turning now to FIG. 5, a method for communicating location information according to an alternate embodiment of the present invention is shown. A WLAN enabled controller, such as the WLAN enabled controller 104, is provided in a vehicle at a step 502. It is then determined whether an emergency condition is detected at a step 504. If an emergency condition is detected, the WLAN enabled controller in the vehicle originates an emergency public access request over a WLAN link at a step 506. Such an emergency public access request could be a certain standardized code known in the industry, or some other detectable message which could be received and deciphered by a separate WLAN device.

It is then determined whether a separate WLAN device is found at a step 508. If a device is found, the WLAN device attempts to make an emergency voice call to a PSAP at a step 510. It is then determined whether the call is successful at a step 512. If the call is not successful, an attempt to find another WLAN device is attempted at a step 514. If the call is successful, the call is then routed to the WLAN enabled controller in the vehicle at a step 516. The call is preferably routed by a WLAN link between the terminating WLAN device and the WLAN enabled controller in the vehicle. Accordingly, a user of the vehicle can communicate with the PSAP by way of the WLAN enabled controller and hands free functionality of the telematics unit in the vehicle.

If the call is terminated early at a step 518, the WLAN enabled controller in the vehicle attempts to make another emergency public access request over the WLAN link at a step 506. However, the terminating WLAN device could also provide information regarding its location. Because WLAN coverage areas are generally small, the location of the terminating WLAN device could be helpful in providing location information of a disabled vehicle. If the call is not terminated it early, the WLAN enabled controller in the vehicle preferably transfers location and/or emergency information to the terminating WLAN device at a step 520. The terminating WLAN device then transfers the location and/or emergency information to a PSAP and/or a call center at a step 522.

Figure 6:
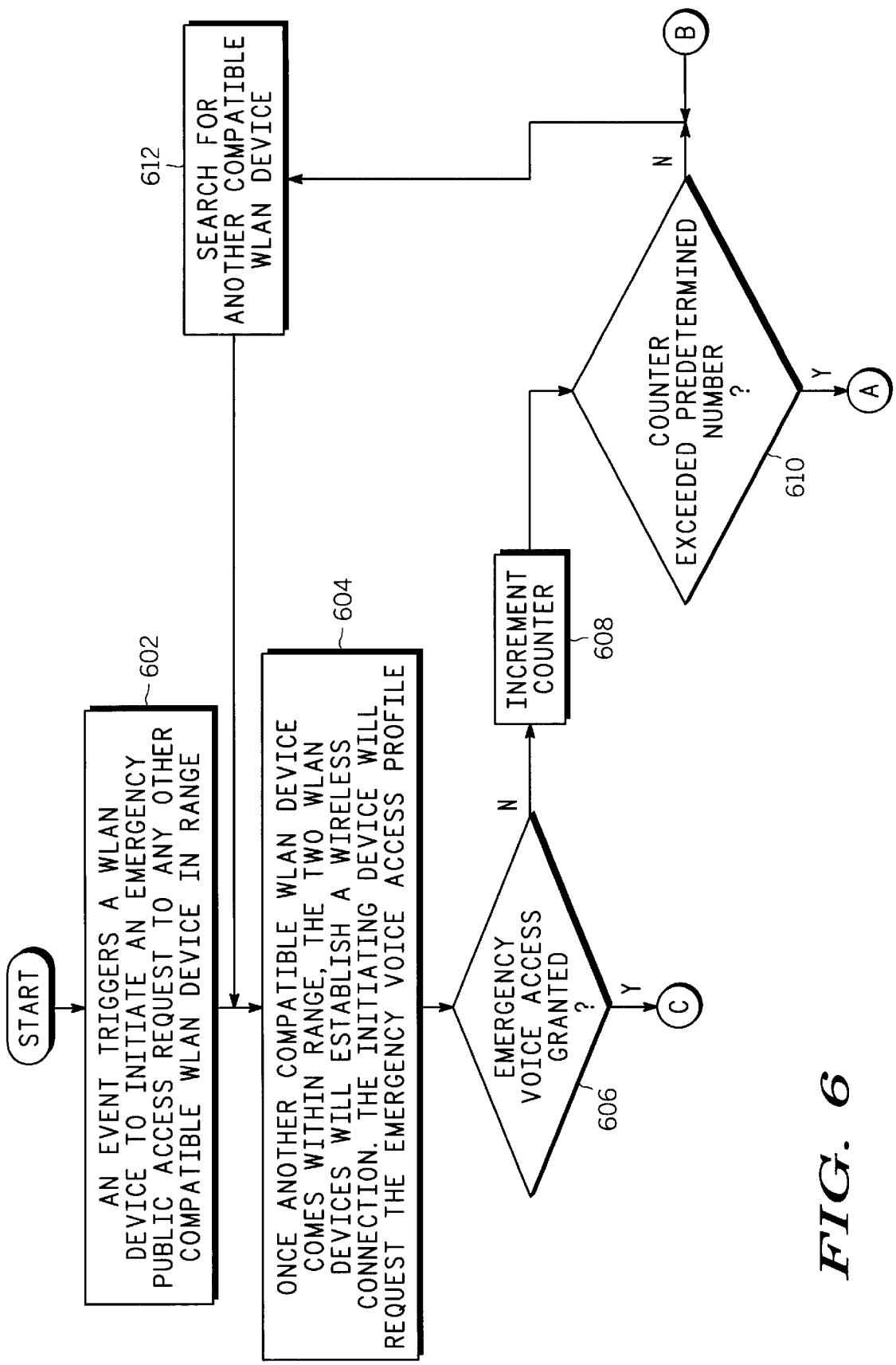
FIG. 6 is a flow chart showing a method for requesting emergency voice access to communicate location information according to the present invention.

Turning now to FIG. 6, a method for requesting voice access to communicate information according to the present invention is shown. If an emergency condition is detected, a WLAN enabled device, such as a WLAN enabled controller of a vehicle, initiates an emergency public access request to any other compatible WLAN device which is within range. The emergency public access request is preferably a standard message sent on a WLAN protocol. That is, the message could be one of a plurality of standard messages which could be understood by a variety of devices adapted to communicate on the WLAN protocol, and could indicate the type of access requested. The message, if received by a compatible WLAN device which is within range, would indicate that the WLAN enabled controller in the vehicle is attempting to acquire a communication link by way of another WLAN enabled device.

In particular, if an emergency event is detected, the WLAN enabled controller in the vehicle initiates an emergency public access request to any compatible WLAN device within range at a step 602. For example, the compatible WLAN device could be a portable WLAN enabled device either inside or outside the vehicle, or some fixed WLAN node outside the vehicle. Once a compatible WLAN device comes within range, the WLAN device (i.e., a terminating WLAN device) and the WLAN enabled controller (i.e., the originating WLAN device) in the vehicle establish a WLAN connection at a step 604. The WLAN enabled device in the vehicle will request an emergency voice access profile at a step 604. The emergency voice access profile will preferably indicate parameters related to the service granted to the WLAN enabled controller. It is then determined if the emergency voice access is granted at a step 606. If the access is not granted, a counter is incremented at a step 608, and it is determined whether the counter exceeds a predetermined number at a step 610. If the counter does not exceed a predetermined number, the WLAN enabled device in the vehicle will search for another compatible WLAN device at a step 612.

Figure 7:
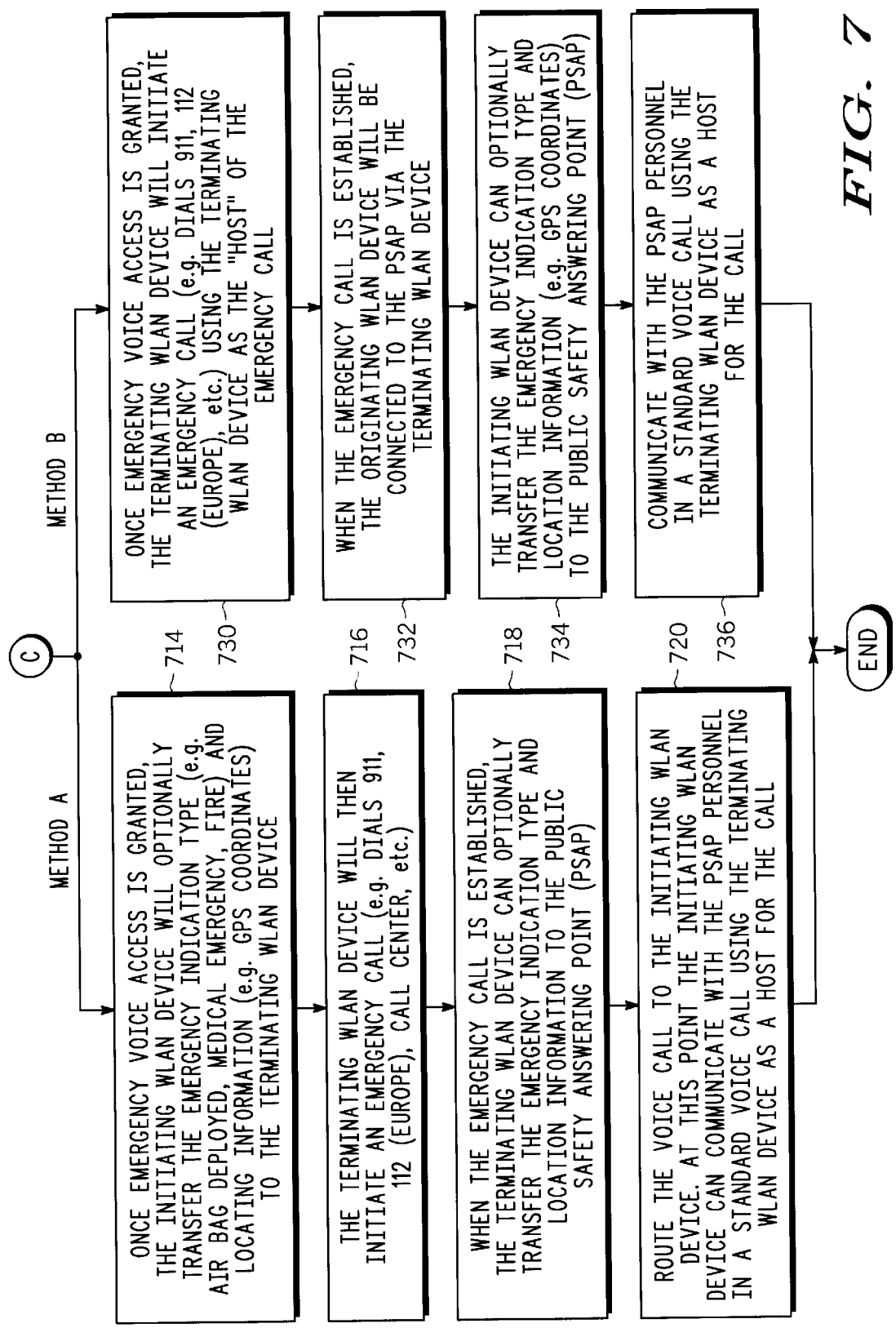
FIG. 7 is a flow chart showing alternate methods for providing emergency voice access according to the present invention.

If emergency voice access is granted at step 606, a voice connection can be created according to one of two methods set forth in FIG. 7. In particular, according to a Method A, once emergency voice access is granted, the WLAN enabled controller in the vehicle will optionally transfer emergency information, such as an air bag deployed, and location information, such as GPS coordinates, to the terminating WLAN device at a step 714. The terminating WLAN device will then initiate an emergency call at a step 716. The call could be to a standard emergency number, such as 911 in the U.S. or 112 in Europe. Alternatively, an emergency call number could be included with the information provided to the terminating WLAN device.

When the emergency call is established, the terminating WLAN can optionally transfer the emergency indication type and location information to a PSAP at a step 718. The voice call would then be routed to the WLAN enabled controller at a step 720. A user in the vehicle can communicate with the PSAP personnel in a standard voice call using the terminating WLAN device, which is in communication with the vehicle by a WLAN communication link, as a host for the voice call.

Alternatively, once the emergency voice access is granted according to a Method B, the terminating WLAN device will initiate an emergency call using the terminating WLAN device as a host at a step 730. When the emergency call is established, the originating WLAN device will connect to the PSAP via the terminating WLAN device at a step 732. The originating WLAN enabled device can optionally transfer the emergency indication type and location information to the PSAP at a step 734, and a user of the vehicle can then communicate with the PSAP personnel in the standard voice call using the terminating WLAN device as a host for the call at a step 736.

Figure 8:
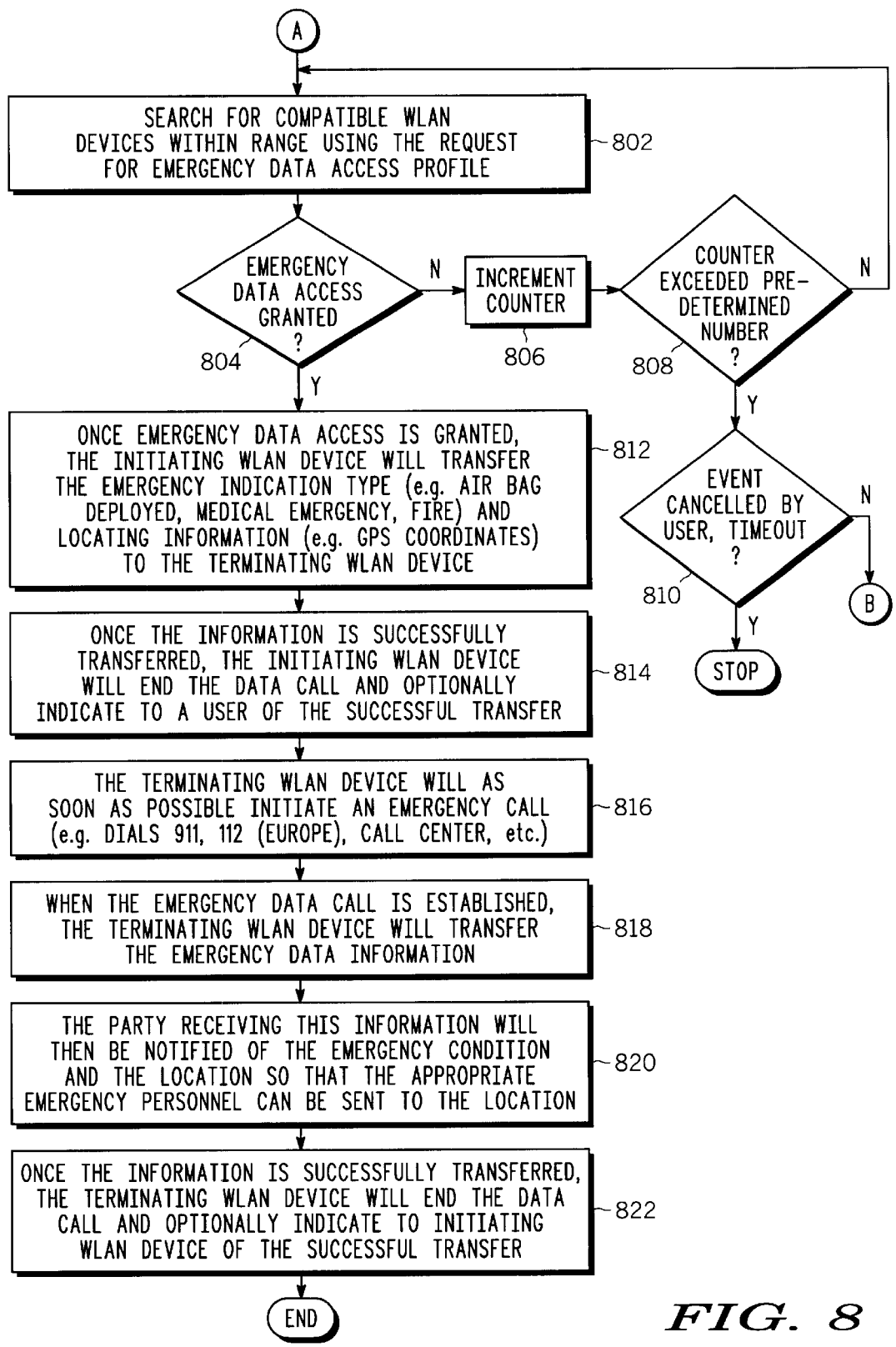
FIG. 8 is a flow chart showing a method for requesting emergency data access to communicate location information according to the present invention.

If emergency voice access is not granted and the counter has exceeded the predetermined number at step 610, the WLAN enabled controller in the vehicle then attempts to establish an emergency data access as described in FIG. 8. In particular, the WLAN enabled controller in the vehicle searches for a compatible WLAN device within range using the request for emergency data access profile at a step 802. Similar to the emergency voice access profile, the emergency data access profile provides parameters related to the service which would be granted to the WLAN enabled controller by the compatible WLAN device. It is then determined if emergency data access is granted at a step 804. If no access is granted, a counter is incremented at a step 806. It is then determined whether the counter has exceeded a predetermined number at a step 808. If the counter has not exceeded a predetermined number, the WLAN enabled controller within the vehicle continues to search for a compatible WLAN device within range at the step 802.

However, if the counter has exceeded a predetermined number at the step 808, it is then determined whether the event is canceled by the user or time out has occurred at a step 810. If the event is not canceled or no time out has occurred, the WLAN enabled controller continues to search for another compatible WLAN device at step 612 of FIG. 6.

If the emergency data access is granted at the step 804, the WLAN enabled controller in the vehicle transfers emergency information and/or location information to the terminating WLAN device at a step 812. Once the information is successfully transferred, the initiating WLAN device will end the data call and optionally indicate to the user of the successful transfer at a step 814. The terminating WLAN device will as soon as possible initiate an emergency call and transfer the emergency information and/or location information at step 816.

When the emergency data call is established, the terminating WLAN will transfer the emergency information and/or location information at step 818. The party receiving this information, such as a PSAP or call center, will be notified of the emergency condition and the location of the vehicle so that the appropriate emergency personnel can be sent to the location 820. Once the information is successfully transferred, the terminating WLAN device will end the data call and optionally indicate to its user of the successful transfer at a step 722.

Although the present disclosure specifically addresses telematics applications, there are numerous other applications for the method and system described. For example, a computer with a WLAN node could initiate an emergency call using any Bluetooth enabled cellular device or Bluetooth enabled fixed phone within its proximity. This would be useful for emergency situations where the user did not have access to a phone. The built-in microphone and speaker of the computer could be used for voice communications. Similarly, portable emergency phones could be used for convention centers, special events, shows, etc. Instead of having wired emergency phones or cellular emergency phones, low cost Bluetooth enabled devices with headsets could be deployed remotely. These devices would then try to access a few centralized Bluetooth node access points installed within the area.

It can therefore be appreciated that a new and novel method and system for coupling location information has been described. It will be appreciated by those skilled in the art that, given the teaching herein, numerous alternatives and equivalent will be seen to exist which incorporate the disclosed invention. As a result, the invention is not to be limited by the foregoing exemplary embodiments, but only by the following claims.

We claim:

1. A method for making an emergency public access request from a vehicle, said method comprising the steps of:
   providing a WLAN communication device with a controller in said vehicle;
   detecting an emergency condition; and
   attempting to create a communication link with a portable WLAN enabled device, wherein attempting to create the communication link comprises making the emergency public access request.

2. The method of claim 1 wherein said step of providing a WLAN communication device with a controller comprises providing WLAN node with a telematics controller in a vehicle.

3. The method of claim 1 wherein said step of detecting an emergency condition comprises detecting an air bag deployment.

4. The method of claim 1 further comprising a step of creating a data communication link by way of a WLAN communication protocol.

5. The method of claim 4 further comprising a step of downloading location information to said portable WLAN device.

6. The method of claim 5 further comprising a step of uploading location information from said portable WLAN device to a PSAP.

7. The method of claim 6 wherein said step of uploading location information comprises uploading information by way of a cellular network.

8. The method of claim 1 further comprising a step of creating a voice communication link between a PSAP and said WLAN communication device.

9. The method of claim 8 further comprising a step of providing location information and emergency information from said WLAN communication device to a PSAP by way of said portable WLAN device.

10. A method for coupling location information, said method comprising the steps of:
    providing a WLAN communication device with a telematics controller in a vehicle;
    detecting an emergency condition at said vehicle;
    attempting to create a communication link with a portable WLAN enabled device;
    downloading location information to said portable WLAN enabled device; and
    creating a voice connection between said telematics controller and a PSAP by way of said portable WLAN enabled device.

11. A method for making an emergency public access request, said method comprising the steps of:
    providing a WLAN communication device with a controller in a vehicle;
    detecting an emergency condition;
    attempting to create a communication link with a separate WLAN enabled device, wherein attempting to create the communication link comprises making the emergency public access request; and
    creating a voice communication link between said WLAN enabled controller in a vehicle and a PSAP by way of said separate WLAN enabled device.

12. The method of claim 11 wherein said step of providing a WLAN communication device with a controller in a vehicle comprises providing a WLAN node with a telematics controller in a vehicle.

13. The method of claim 11 wherein said step of detecting an emergency condition comprises detecting an air bag deployment.

14. The method of claim 11, further comprising a step of downloading location information and emergency information from said controller in the vehicle to said portable WLAN device.

15. The method of claim 14, wherein said step of downloading the location information and the emergency information comprises creating a data communication link between said controller in said vehicle and said separate WLAN enabled device by way of a WLAN communication protocol.

16. The method of claim 15 further comprising a step of uploading said location information and said emergency information from said separate WLAN enabled device to a PSAP.

17. The method of claim 16 wherein said step of uploading said location information and said emergency information from said separate WLAN enabled device to a PSAP comprises uploading information by way of a cellular network.

18. The method of claim 11 wherein said step of attempting to create a communication link with a separate WLAN enabled device comprises attempting to create a communication link with a portable WLAN enabled device.

19. The method of claim 18 further comprising a step of downloading location information and emergency information to said portable WLAN enabled device.

20. A method for coupling location information, said method comprising the steps of:

providing a WLAN communication device with a controller in a vehicle;

detecting an emergency condition;

requesting emergency voice access with a separate WLAN enabled device:

requesting emergency data access if said emergency voice access is not granted; and providing the location information and emergency information to said separate WLAN enabled device.

21. The method of claim 20 wherein said step of requesting emergency voice access comprises requesting emergency voice access a predetermined number of times before requesting emergency data access.

22. The method of claim 20 wherein said step of requesting emergency voice access comprises making a request for an emergency voice access profile.

23. The method of claim 20 wherein said step of requesting emergency data access comprises requesting emergency data access a predetermined number of times.

24. The method of claim 23 further comprising a step of requesting emergency voice access with another WLAN enabled device after requesting emergency data access a predetermined number of times.

25. The method of claim 20 wherein said step of requesting emergency data access comprises making a request for an emergency data access profile.

26. The method of claim 20 further comprising a step of downloading location information from said WLAN communication in a vehicle to said separate WLAN enabled device by way of a WLAN protocol.

27. The method of claim 20 further comprising a step of uploading said location information from said separate WLAN enabled device to a PSAP.

28. The method of claim 27 wherein said step of uploading said location information comprises providing said location information and emergency information to a PSAP by way of a cellular network.

29. A system for coupling location information from a vehicle, said system comprising:

a controller installed in a vehicle;

a WLAN communication device coupled to said controller;

a WLAN enabled device in communication with said WLAN communication device in said vehicle using a WLAN protocol in response to an emergency condition:

a wireless communication network in communication with said WLAN enabled device; and a public safety answering point in communication with said wireless communication network coupled for receiving the location information via the WLAN enabled device.

30. The system of claim 29 wherein said controller comprises a telematics controller.

31. The system of claim 29 wherein said WLAN enabled device comprises a portable WLAN enabled device.

32. The system of claim 29 wherein said WLAN enabled device comprises a fixed WLAN node along a roadway.

33. The system of claim 29 wherein said wireless communication network comprises a cellular telecommunications network.

34. The system of claim 29 further comprising a GPS unit coupled to said controller in said vehicle.

35. The system of claim 29 further comprising a hands free kit coupled to said controller in said vehicle.

36. The system of claim 29 further comprising an emergency sensor coupled to said controller in said vehicle.

37. The system of claim 36 wherein said emergency sensor comprises an air bag sensor.

38. A system for coupling location information from a vehicle, said system comprising:

a telematics controller installed in a vehicle;

a WLAN communication device coupled to said telematics controller;

GPS unit coupled to said WLAN enabled controller:

a hands free kit coupled to said WLAN enabled controller;

an emergency sensor coupled to said WLAN enabled controller;

a WLAN enabled device in communication with said WLAN enabled controller using a WLAN protocol in response to an emergency condition;

a wireless communication network in communication with said WLAN enabled device; and a public safety answering point in communication with said wireless communication network coupled for receiving the location information via the WLAN enabled device.

* * * * *